Aug. 16, 1966 A. G. FISCHER 3,267,317

DEVICE FOR PRODUCING RECOMBINATION RADIATION

Filed Feb. 25, 1963

2 Sheets-Sheet 1

INVENTOR.
ALBRECHT G. FISCHER
BY
W.S. Hill
AGENT

DEVICE FOR PRODUCING RECOMBINATION RADIATION

Filed Feb. 25, 1963 2 Sheets-Sheet 2

INVENTOR.
ALBRECHT G. FISCHER
BY
A.S. Hel
AGENT

United States Patent Office 3,267,317
Patented August 16, 1966

3,267,317
DEVICE FOR PRODUCING RECOMBINATION RADIATION

Albrecht G. Fischer, Trenton, N.J., assignor to Radio Corporation of America, a corporation of Delaware
Filed Feb. 25, 1963, Ser. No. 260,709
11 Claims. (Cl. 313—108)

This invention relates to a solid state device for producing recombination radiation.

Recombination radiation is electromagnetic radiant energy; e.g., infrared, visible light, ultraviolet; which is produced when charge carriers of opposite conductivity types, electrons and holes, recombine radiatively across the energy bandgap in a luminescent material, directly or via recombination centers. The two types of charge carriers may be introduced into the luminescent material from external sources as by contacts to the luminescent material. Contacts for injecting minority charge carriers into luminescent materials are sometime difficult to fabricate and are generally inefficient, especially so in luminescent materials of the II–VI type.

An object of this invention is to provide a novel device for producing recombination radiation.

Another object is to provide a device for producing recombination radiation having novel and improved means for introducing minority charge carriers into a luminescent material.

A device of the invention comprises generally a body of luminescent material, either intrinsic or extrinsic conducting, means for introducing charge carriers of one conductivity type into the body including a layer of insulator material upon a surface of the body and a layer of extrinsic semiconductor material of the one conductivity type upon said insulator layer, and means for introducing charge carriers of the other conductivity type into the body. The insulator material has a larger bandgap than that of the luminescent material and a thickness which permits tunneling of charge carriers between the body and the semiconductor layer. The semiconductor material has a bandgap which is larger than that of the luminescent material and smaller than that of the insulator.

The means for introducing charge carriers of the one conductivity type into the luminescent body is improved through the novel use of the tunnelable insulator layer in combination with the layer of semiconductor material having a larger bandgap than, and of opposite conductivity type to, that of the luminescent material. The insulator layer avoids the problem of preparing a homogeneous p-n junction between the luminescent material and the material which supplies the charge carriers. The larger bandgap of the semiconductor reduces the backflow of charge carriers of the other conductivity type (carrier extraction) from the luminescent material back to the source of charge carriers of the one conductivity type. Thus, one may select an improved carrier injecting means from a larger group of contact materials which are more easily tailored to commercially feasible fabrication processes.

Figure 1:
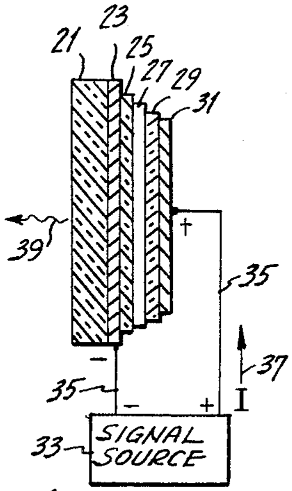
Figure 2:
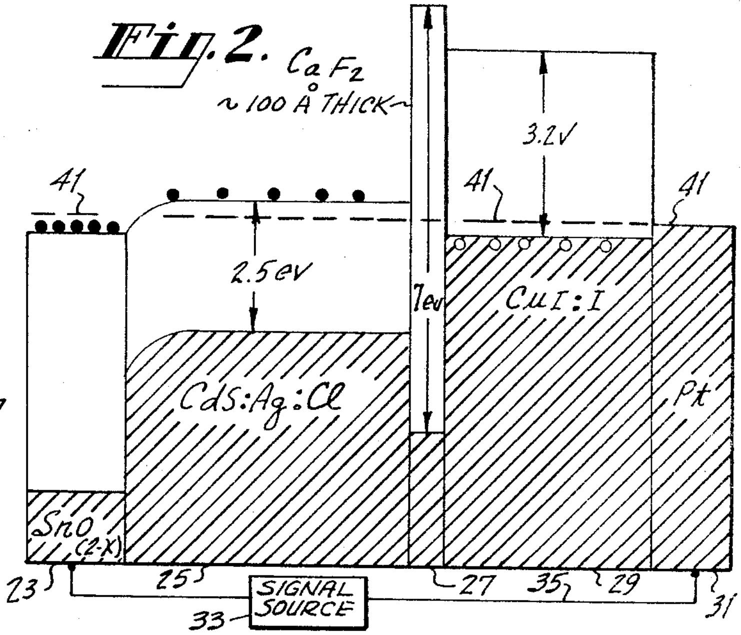
Figure 4:
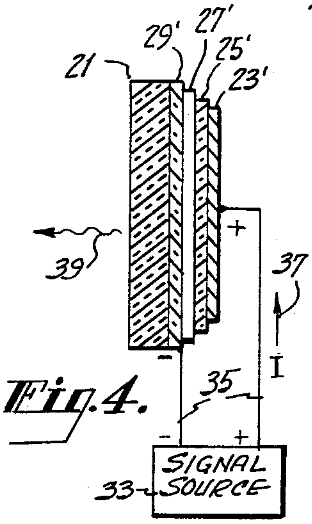
Figure 3:
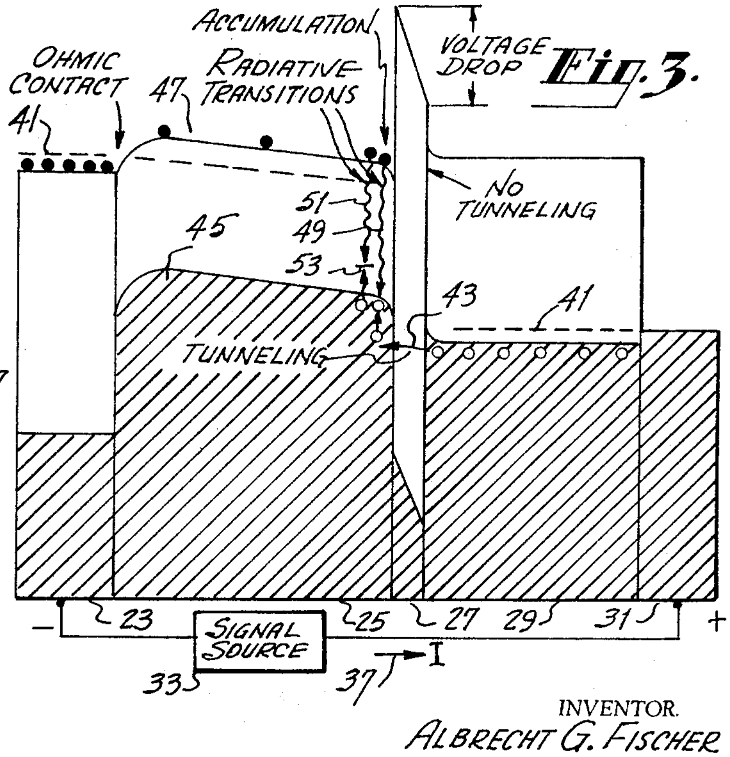
Figure 5:
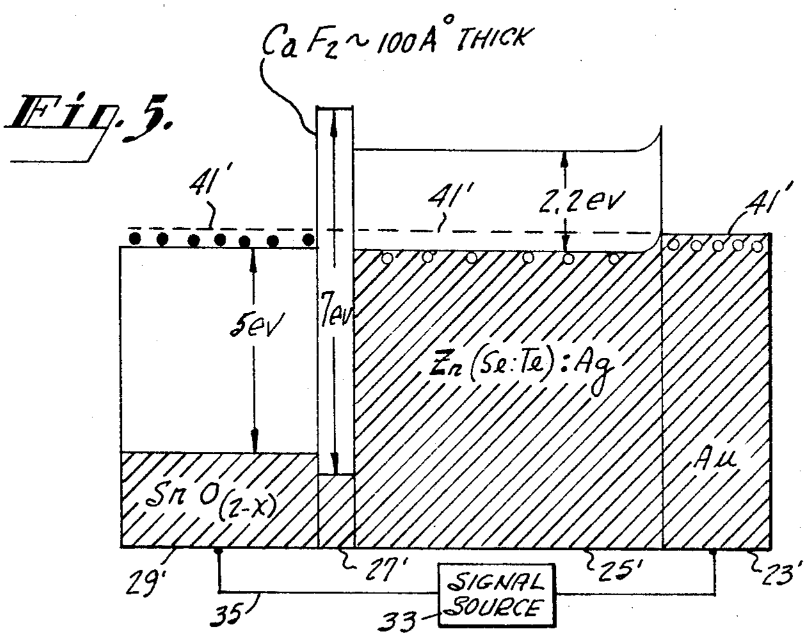
Figures 6, 7:
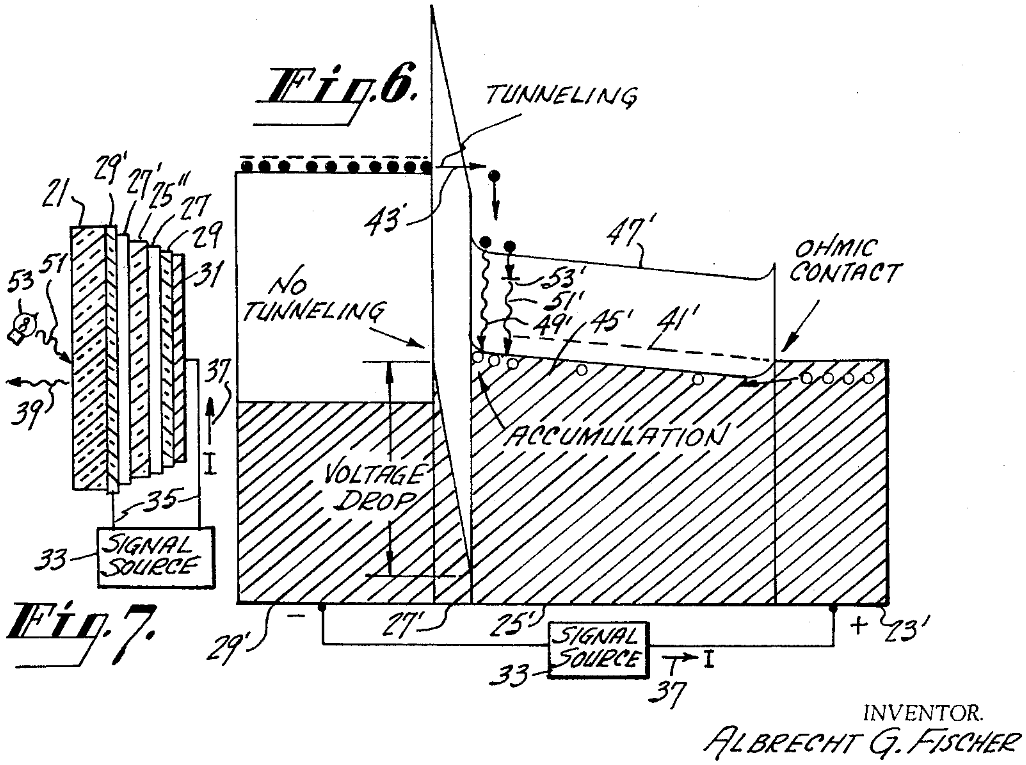

A more detailed description of the invention and illustrative embodiments thereof appear below in conjunction with the drawings in which:

FIGURE 1 is a sectional view of a first embodiment of the invention including an N-type luminescent material, FIGURES 2 and 3 are energy band diagrams of the device of FIGURE 1 in the quiescent and emitting conditions respectively, FIGURE 4 is a sectional view of a second embodiment of the invention including a P-type luminescent material, FIGURES 5 and 6 are energy band diagrams of the device of FIGURE 4 in the quiescent and emitting conditions respectively, and FIGURE 7 is a sectional view of a third embodiment of the invention including a substantially intrinsic luminescent material.

Similar reference numerals are used for similar elements throughout the drawings.

In general, a device of the invention comprises a body of luminescent material in which radiative recombination may take place efficiently, means for introducing holes (positive charge carriers) into the body, and means for introducing electrons (negative charge carriers) into the body. The introduced charge carriers may recombine radiatively across the bandgap of the luminescent material, emitting radiation which is usually about the energy of the bandgap, or, with proper impurity doping, the emitted radiation may be less than the energy of the bandgap and the recombination may proceed via localized impurity centers.

The luminescent material may be any material which favors radiative transitions of the charge carriers and which does not favor nonradiative transitions. The luminescent material may be extrinsic in either N-type conductivity or P-type conductivity; or may be intrinsic or near intrinsic in the sense that the luminescent material does not have a predominant conductivity type. In describing the invention, intrinsic luminescent material includes also luminescent materials which are near intrinsic.

In the case of an extrinsic luminescent material, means for introducing charge carriers of the same conductivity type as the luminescent body is usually easy to provide; while means for introducing carriers of the other conductivity type (minority carriers) is difficult to provide. In the case of an intrinsic luminescent material, it is difficult to provide means for introducing carriers of both conductivity types.

In the case of the extrinsic luminescent material, the means for introducing charge carriers of the opposite type to that of the luminescent material (minority carriers) comprises a thin, tunnelable insulator layer on the body of the luminescent material and, upon the insulator, a layer of semiconductor material having the same conductivity type as the charge carriers which are to be injected. The insulator material has a large energy bandgap and is thin enough to permit the tunneling of charge carriers therethrough. The insulator layer is preferably between 10 and 1000 A.U. thick. When the insulator layer is too thick, the energy losses are high and the device requires a relatively high voltage for operation. When the insulator layer is too thin, the device tends to burn out rapidly. The optimum thickness seems to be about 100 A.U. thick. The semiconductor layer may be any convenient thickness and has an energy bandgap which is larger than that of the luminescent material and smaller than that of the insulator. In the case of intrinsic luminescent material, the foregoing structure may be used for providing means for introducing charge carriers of one or both conductivity types. Thus, for an intrinsic luminescent body, a means for introducing holes includes a P-type semiconductor spaced from the luminescent body by a tunnelable insulator layer; and a means for introducing electrons includes an N-type semiconductor spaced from the luminescent body by a tunnelable insulator layer.

The efficiency of the means for introducing charge carriers is further improved by a proper relationship of the work functions between the luminescent material and the insulator. Where positive charge carriers are to be introduced, it is preferred that the insulator layer have a low work function, making the potential barrier which has to be tunnelled lower for holes in the valence band of the P-type semiconductor than for electrons in the conduction band of the luminescent material. Where negative charge carriers are to be introduced into the luminescent material, it is preferred that the insulator have a high work function, making the potential barrier which has to be tunnelled lower for electrons in the conduction band of the N-type semiconductor than for holes in the valence band of the luminescent material. The term work function is used to mean the energy between the energy of the lower edge of the conduction band and the energy of the vacuum level.

This relation of work function is important since it has an influence on the magnitude of the potential barrier through which carriers have to tunnel in order to reach the luminescent material. To facilitate injection of carriers into the luminescent material, the barrier should be low. To impede extraction of carriers from the luminescent material into the contacts, the barrier should be high. By the choice of a high work function insulator, the potential barrier is simultaneously low for electron injection and high for hole extraction. By choice of a low work function insulator, the potential barrier is simultaneously low for hole injection and high for electron extraction.

The present invention uses a semiconductor on one side of the insulator layer, which semiconductor has a wider bandgap than does the luminescent material on the other side of the insulator layer. This relationship of bandgaps reduces carrier extraction from the luminescent material during the operation of the device. By carrier extraction is meant that carriers which are introduced by one contact into the luminescent material flow out the other contact. Since extracted carriers do not participate in radiative recombination, they constitute a loss in the efficiency of the device. In the novel device, carriers which accumulate in the luminescent material near the insulator try to flow out of the luminescent material by tunneling to the semiconductor. However, at the applied voltage, these carriers are at energy levels which are opposite the bandgap of the semiconductor where the presence of carriers is prohibited, and carrier extraction by tunneling is thereby prevented. Ideally, there are no receiving states in the bandgap of the semiconductor for carriers to tunnel to. However, in practice, there are "surface states" in the semiconductor that form localized states in the bandgap of the semiconductor which may function as receiving states. The effects of these surface states on carrier extraction may be reduced by reducing their concentration in the semiconductor near the insulator. Also, their effects on carrier extraction is reduced by reducing the tunneling probability of the extracted carriers through the insulator, as by the proper choice of work function for the insulator, as described above.

The recombination radiation generated in the device of the invention may be brought out through the luminescent material. It is preferred, however, to provide the luminescent material in thin layers. In such a structure, it is preferred that one or both of the means for introducing charge carriers is transparent to the recombination radiation, and that the recombination radiation is brought out through this transparent structure.

*Device with N-type luminescent material*

*Example 1.*—FIGURE 1 is a sectional view of an embodiment of the invention including an N-type luminescent body. The embodiment includes a transparent support 21 having successive layers thereon in the following order: a transparent, electrically-conducting coating 23, an N-type luminescent body 25, a thin tunnelable insulator layer 27, a P-type semiconductor layer 29, and a metal layer 31. Each layer physically contacts its adjacent layer or layers.

FIGURE 1 includes also a circuit comprising a D.C. signal source 33 connected to the conducting layer 23 and the metal layer 31 through leads 35. The signal source 33 may be a battery and single pole switch, or may be any other continuous or intermittent D.C. signal source, or may be an A.C. signal source. When a D.C. current flows in the direction indicated by the arrow 37, recombination radiation is emitted through the transparent base 21 in the direction indicated by the arrow 39.

The embodiment illustrated in FIGURE 1 may be prepared by the following process. A glass sheet 21 coated with a transparent electrically-conducting tin oxide layer 23 serves as a substrate and transparent electrode. The tin oxide layer (described by the formula $SnO_{(2-x)}$ where $x$ has a positive value less than 2) is deficient in oxygen and is of the type known in the art for producing transparent conducting layers on glass. On the conducting coating 23, an N-type luminescent layer 25 of CdS is deposited. The luminescent layer 25 can be prepared in the following way: Cadmium sulfide CdS is evaporated in vacuum onto the substrate maintained at about 200 C. until a layer of suitable thickness, generally about 50 microns thick, (although it may be any thickness from 1 to 1000 microns) is obtained. The evaporated layer is embedded into a mass of CdS powder that contains activators which render the powder luminescent and conducting; for instance, with $10^{-4}$ grams silver/gram powder and $5\times10^{-3}$ grams bromine/gram powder. The embedded layer is then baked in a protective atmosphere such as argon, for a suitable time, for example 24 hours, and at a suitable temperature, for example 500° C. The activation and crystallization of the evaporated layer takes place by solid state diffusion during the baking. By this process, the evaporated layer 25 is well crystallized after baking, is luminescent, N-type, conducting, and is ready for further processing.

The luminescent layer 25 is polished and etched to provide a smooth surface. After polishing and etching, a calcium fluoride insulator layer 27 about 100 A.U. thick is evaporated in vacuum upon the luminescent layer 25. The thickness of the calcium fluoride layer 27 may be monitored during its preparation by counting the interference maxima and minima of a test sample which was three times closer to the evaporation source than the luminescent layer 25. Next, the P-type semiconductor layer 29 is deposited upon the insulator layer 27. A convenient P-type semiconductor is cuprous iodide CuI:I. A cuprous iodide film can be obtained by vacuum evaporation of copper iodide directly upon the insulator layer 27. A metal layer 31 is produced by evaporating platinum metal upon the copper iodide layer 29. The metal layer acts as a back electrode. The cuprous iodide layer 29 is electrically conducting due to the presence of an excess of iodine in the layer. The conductivity of the cuprous iodide layer can be increased by increasing the proportion of iodine in the material. Since iodine is volatile, a plastic coating on the back surface of the device may be advantageous to retain the iodine in the cuprous iodide layer.

In operation, the device of FIGURE 1 is biased so that the metal electrode 31 is positive and the conducting layer 23 is negative. With about 10 volts applied, current flows through the device and an orange emission is observed through the transparent support 21. A similar device in which the insulator layer 27 is omitted produces no light emission under the same conditions.

FIGURE 2 is an energy diagram for the device of FIGURE 1 in the quiescent state; that is, with no bias voltage applied. In FIGURE 2 (and 3, 5 and 6) the ordinate represents values of energy and the abscissa represents distance along the device. The Fermi level 41 in all of the layers is at the same energy, which is plotted as the ordinate. The various energy bandgaps are indicated for each material. FIGURE 3 is a similar energy diagram for the device of FIGURE 1 with a bias voltage applied so that recombination radiation is emitted. The bias voltage has the effect of raising the energy levels at the negatively-biased end of the device with respect to the postively-biased end of the device. Most of the voltage drop due to the bias appears across the insulator layer 27, and comparatively little of the voltage drop appears across the other structures in the device. The effect of this voltage distribution is to provide comparatively easy and efficient tunneling of holes through the insulator 27 from the semiconductor 29 to the luminescent material 25 as indicated by the arrow 43. Electrons are introduced into the luminescent material 25 from the conducting layer 23 by means of the ohmic contact in combination with a relatively small negative bias on the conducting layer 23. Electrons accumulate in the luminescent body 25 near the interface with the insulator layer 27. Electrons are prevented from tunnelling from the luminescent body 25 to the semiconductor layer 29 by the larger bandgap of the semiconductor layer 29. Thus, electrons are introduced into the luminescent body from the ohmic contact of the conducting layer 23, and simultaneously, holes are introduced into the luminescent layer 25 by tunnelling through the insulator layer 27. The holes are introduced into the valence band 45 of the luminescent layer 25 and electrons are introduced into the conduction band 47 of the luminescent layer 25. The introduced carriers recombine in the luminescent material directly across the energy bandgap between the valence band 45 and the conduction band 47 by radiative transitions as indicated by the arrow 49, and radiative transitions indicated by the arrow 51 via recombination centers 53 in the energy bandgap. The energy transitions indicated by the arrows 49 and 51 are predominantly radiative by virtue of the selection of the luminescent material of the layer 25.

Various substitutions in the embodiment of Example 1 may be made. The glass sheet 21 may be replaced with any other transparent support, such as a methyl methacrylate plastic. The transparent conducting layer 23 may be replaced with any other transparent conducting material, such as indium oxide deficient in oxygen (which may be represented by the formula $In_2O_{(3-x)}$ where $x$ is between 1 and 3). Another way of preparing the luminescent layer 25 is by converting an evaporated CdS film into a near single crystalline film by means of the Van Cakenberghe method. This method normally gives highly resistive nonluminescent films. By incorporating a coactivator such as Al, In, Cl, Br, I, but preferably Ga, into the CdS layer, layers can be obtained which are N-type, conducting, luminescent, and near single crystalline.

Instead of using evaporated and recrystallized CdS layers, slices of conducting luminescent CdS single crystals can be used. The CdS single crystals can be prepared by a vapor transport method, or by growing from a melt. In the case of single crystals, no transparent glass support is required and electrodes can be evaporated, sprayed, or painted directly on the CdS crystal. For instance, a transparent conducting indium oxide layer which makes ohmic contact to the CdS can be prepared by heating the CdS crystal at about 300° C. and exposing it to a sprayed mixture of $InCl_3$ dissolved in dilute acetic acid. The conductivity of the transparent conducting film can be reinforced by a metal grid or a comb structure superimposed on the indium oxide layer in such a way that not too much light is absorbed by it.

In place of the CdS:Ag:Cl luminescent material, other luminescent materials which favor radiative recombination processes may be used. Some suitable materials are ZnO, (CdZn)S,ZnSe,Zn(Se,Te), GaP, Ga(P,As) or BAs.

In place of the $CaF_2$ used as the insulator layer 27 in Example 1, other insulators may be used. Some suitable insulator materials are $BeF_2$, KCl, SiO, MgO, BeO, $Al_2O_3$, $CdF_2$, or $ZnF_2$.

Another way to prepare the insulator layer 27 is to evaporate a thin metal film first upon the luminescent layer 25. Then, the metal film is oxidized by exposure to oxygen gas, or anodizing solutions, to produce the metal oxide. Aluminum oxide and beryllium oxide films may be prepared in this way.

Another method for preparing an insulator layer, which is applicable to zinc and cadmium chalcogenides, includes exposing the surface of the luminescent material to hydrogen fluoride gas at elevated temperatures. A layer of zinc and/or cadmium fluoride forms on the surface of the luminescent layer 25. $ZnF_2$ and $CdF_2$ are wide bandgap materials with insulating properties. This method has the advantage of reducing the probability of producing pin holes in the insulator layer 27. It is also possible to use organic or silico-organic insulating films made by spraying or dipping.

In luminescent materials composed of gallium compounds, it is possible to produce an insulating, wide bandgap gallium nitride insulator layer by heating a body of the material (e.g., GaAs) in ammonia.

Other semiconductor materials may be substituted for the CuI:I semiconductor material of the semiconductor layer 29 of Example 1. Some suitable materials are BP, P-type diamond or SiC.

Other techniques for producing the semiconductor layer 29 may be used since neither of the techniques of fabrication is critical in preparing this layer. Similarly, other metals and other techniques of fabrication may be used for preparing the metal layer 31.

*Device with P-type luminescent material*

*Example 2.*—FIGURE 4 is a sectional view of an embodiment of the invention including a P-type luminescent body. The embodiment includes a transparent support 21 having successive layers thereon in the following order: an N-type semiconductor coating 29′, a thin tunnelable insulator layer 27′, a P-type luminescent body 25′, and a conducting layer 23′. The semiconductor of the coating 29′ has an energy bandgap larger than that of the luminescent material and smaller than that of the insulator.

FIGURE 4 includes also a circuit comprising a signal source 33 connected to the semiconductor layer 29′ and the conducting layer 23′ through the leads 35. The signal source 33 may be a battery and a single pole switch, or may be any other continuous or intermittent D.C. signal source or an A.C. source. When a positive bias is applied to the conducting layer 23′, a current flows in the direction indicated by the arrow 37 and recombination radiation is emitted through the transparent base 31, in the direction indicated by the arrow 39.

The embodiment illustrated in FIGURE 4 may be prepared by the following processes. A hot glass substrate 21 is sprayed with a tin tetrachloride solution to form a conducting tin oxide film 29′ thereon. The tin oxide film 29′ is a degenerate, wide bandgap semiconductor, which is deficient in oxygen, having the formula $SnO_{(2-x)}$ where $x$ has a positive value less than 2. The tin oxide film 29′ serves in the device simultaneously as a transparent electrode and as an electron emitter. The tin oxide film 29′ is coated with an insulator layer of $CaF_2$ by evaporation. On top of the insulating layer 27′ there is deposited a luminescent layer of a zinc seleno telluride having the molar formula $$0.5ZnTe:0.5ZnSe:0.01Ag$$

The luminescent layer 25′ may be deposited by evaporation in a vacuum. Finally, a conducting layer 23′ of metallic gold is electrolytically coated upon the luminescent layer 25′.

In operation, the device is biased so that the conducting electrode 23′ is positive and the semiconductor layer 29′ is negative. When current flows in the circuit in the direction indicated by the arrow 37, a red emission is observed through the transparent support 21. A similar device in which the insulator layer 27′ was omitted produced no light emission under the same conditions.

FIGURE 5 is an energy diagram of the device of FIGURE 4 in the quiescent state; that is, with no voltage applied to the device. The Fermi level 41 in all of the layers is at the same energy (plotted as the ordinate). The various energy bandgaps are indicated in electron volts (ev.) for each material comprising the device.

FIGURE 6 is an energy diagram of the device of FIGURE 4 biased to produce recombination radiation. A positive bias voltage applied to the conducting electrode 23′ lowers the energy levels of the conducting electrode 23′ with respect to the semiconductor layer 29′ which is biased negatively. Most of the voltage drop appears across the insulator layer 27′. The layer 27′ provides an efficient means for introducing electrons into the luminescent layer 25′ by tunnelling from the semiconducting layer 29′ through the insulating layer 27′ as indicated by the arrow 43′. Holes are introduced into the luminescent layer 25′ from the conducting layer 23′ by means of an ohmic contact between the layers 23′ and 25′. The holes are introduced into the valence band of the luminescent layer 25′ and the electrons are introduced into the conduction band of the luminescent layer. The introduced electrons combine with the introduced holes by radiative transitions indicated by the arrows 49′ and 51′. Holes accumulate in the luminescent layer 25 near the insulator layer 27′ and are prevented from tunnelling from the luminescent body 25′ to the semiconductor layer 29′ by the larger bandgap of the semiconductor layer 29′. The radiative transitions 49 produce the red emission observed as the output of the device.

The embodiment of Example 2 may be modified in numerous ways. The semiconducting layer 29′ may be any semiconducting material which has a relatively high conductivity and a bandgap wider than that of the luminescent material, such as conducting tin oxide $SnO_{2-x}$, or indium oxide $In_2O_{3-x}$, or $CdF_2$:Sm:Cd. In place of the single transparent semiconductor layer 29′, one may use a grid of a metal or other conducting material overlaid with a less conducting semiconductor material. The energy bandgap of the semiconductor of the layer 29′ should be greater than that of the luminescent material and smaller than that of the insulator.

In place of the evaporated $CaF_2$ of Example 2, one may use $Al_2O_3$ or BeO films prepared by first evaporating the corresponding metal film and then oxidizing the metal film to form the desired metal oxide.

Another method for producing an insulating film on a tin oxide layer consists in anodizing the thin oxide layer in an oxidizing electrolyte so that the surface of the layer becomes stoichiometric, insulating tin oxide, whereas the deeper layers remain oxygen deficient and hence conducting.

Some other insulating materials which may be evaporated to produce the insulating layer 27′ are MgO, $CdF_2$, and $ZnF_2$.

In place of the luminescent material of Example 2, one may use ZnTe, ZnSe or GaP.

In place of the conducting electrode 23′, one may substitute silver, tellurium, or copper iodide.

*Device with intrinsic luminescent material*

*Example 3.*—FIGURE 7 is a sectional view of an embodiment of the invention including an intrinsic luminescent body 25″. Embodiment includes a transparent support 21 having successive layers thereon in the following order: a first N-type semiconducting layer 29′; a first thin tunnelable insulating layer 27′, a luminescent body 25″, a second thin tunnelable insulating layer 27, a second P-type semiconducting layer 29 and a conducting layer 31. The glass substrate 21, the first semiconducting layer 29′ and the first insulating layer 27′ are the same in structure and fabrication as that described in Example 2. The second insulating layer 27, the second semiconducting layer 29 and the conducting layer 31 are the same in structure and fabrication as that described in Example 1. The luminescent layer 25″ is distinguished from the luminescent layers of the previous example in that it is intrinsic; that is, there is no predominant conductivity type. For this reason, it is difficult to introduce both positive and negative charge carriers into the luminescent material. In this embodiment, both types of charge carriers are introduced simultaneously through the insulator-semiconductor structures described in Examples 1 and 2 or the variations thereof. Some luminescent materials which may be used in the luminescent layer 25″ are intrinsic materials having the formula GaP, GaAs, GaN, BAs, ZnS, ZnS-CdS, ZnS-ZnSe, ZnSe-ZnTe or ZnO.

FIGURE 7 includes also a circuit comprising a D.C. signal source 33 connected to the semiconducting coating 29′ and conducting layer 31 through leads 35 as in the previous examples. When a positive bias is applied to the conducting layer 31, a D.C. current flows in the direction indicated by the arrow 37 and recombination radiation is emitted through the transparent base 21 in the direction indicated by the arrow 39.

Because the luminescent material 25″ is intrinsic, it is frequently necessary to prime the device by imparting sufficient conductivity to the layer as by photoconductivity. To this end, a flash of light as indicated by the arrow 51 from a light source 53 is sufficient to prime the layer. Once the luminescent layer 25″ has been primed, the device will sustain itself with the emitted recombination radiation and introduced charge carriers to continue emitting.

What is claimed is:

1. A device comprising
 a body of luminescent material;
 means for introducing charge carriers of one conductivity type into said body including a layer of insulator material upon a surface of said body, said insulator material having a larger bandgap than that of said body and a thickness which permits tunneling of charge carriers therethrough, and a layer of extrinsic semiconductor material of said one conductivity type upon said insulator layer and having a bandgap which is larger than that of said body material and smaller than that of said insulator; and
 means for introducing charge carriers of the other conductivity type into said body.

2. A device for producing recombination radiation comprising
 a body of luminescent material,
 means for introducing charge carriers of one conductivity type into said body including a layer of insulator material upon a surface of said body, said insulator material having a larger bandgap than that of said body and a thickness which permits tunneling of charge carriers through said insulator in the range of 10 A.U. to 1000 A.U., a layer of extrinsic semiconductor material of said one conductivity type upon said insulator layer and having a bandgap which is larger than that of said body and smaller than that of said insulator, and
 means for introducing charge carriers of the other conductivity type into said body.

3. A device for producing recombination radiation comprising
 a body of extrinsic luminescent material of one conductivity type,
 means for introducing charge carriers of the other conductivity type into said body including a layer of insulator material upon a surface of said body, said insulator material having a larger bandgap than that of said body and a thickness which permits tunneling of charge carriers therethrough in the range of 10 to 1000 Angstrom units, and a layer of extrinsic semiconductor material of said other conductivity type upon said insulator layer and having a bandgap which is larger than that of said body material and smaller than that of said insulator, and means for introducing charge carriers of said one conductivity type into said body.

4. A device for producing recombination radiation comprising a body of N-type luminescent material, means for introducing positive charge carriers into said body, comprising a layer of insulator material upon a surface of said body, said insulator material having a low work function, a bandgap substantially larger than that of said body, and a thickness which permits tunneling of charge carriers therethrough in the range of 10 to 1000 Angstrom units, and a layer of P-type semiconductor material upon said insulating layer, said P-type material having a bandgap which is larger than that of said body material and smaller than that of said insulator material, and means for introducing negative charge carriers into said body.

5. A device for producing recombination radiation comprising a body of N-type luminescent material selected from the group consisting of CdS; CdS:ZnS, ZnSe:ZnTe, ZnO, GaP, GaN, and BAs, means for introducing positive charge carriers into said body including a layer of insulator material upon a surface of said body, said insulator material having a low work function, a bandgap substantially larger than that of said body, a thickness which permits tunneling of charge carriers through said insulator material layer in the range of 10 to 1000 Angstrom units, and selected from the group consisting of MgO, BeO, $Al_2O_3$, $CdF_2$, and $ZnF_2$, a layer of P-type semiconductor material upon said insulating layer, said P-type material having a bandgap which is larger than that of said body material and smaller than that of said insulator material, and selected from the group consisting of CuI:I, BP:Be, P-Diamond, P-SiC;

and means for introducing negative charge carriers into said body.

6. A device for producing recombination radiation comprising a body of N-type luminescent material in which said radiation is to occur, means for introducing positive charge carriers into said body including a layer of insulator material upon a surface of said body, said insulator material having a low work function, a bandgap substantially larger than that of said body, and a thickness which permits tunneling of charge carriers through said insulator material in the range between 10 and 1000 A.U.

a layer of P-type semiconductor material upon said insulating layer, said P-type material having a bandgap which is larger than that of said body material and smaller than that of said insulator material, and a metal electrode in contact with said semiconductor layer;

and means for introducing negative charge carriers into said body, said means for introducing negative charge carriers being transparent to said recombination radiation.

7. A device for producing recombination radiation comprising a body of P-type luminescent material, means for introducing negative charge carriers into said body including a layer of insulator material upon a surface of said body, said insulator material having a high work function, a bandgap substantially larger than that of said body material, and a thickness which permits tunneling of charge carriers through said insulator material and a layer of N-type semiconductor material upon said insulator layer, said N-type material having a bandgap which is larger than that of said body material and smaller than that of said insulator material, and means for introducing positive charge carriers into said body.

8. A device for producing recombination radiation comprising a body of P-type luminescent material selected from the group consisting of ZnTe, ZnSe, GaP, GaAs, GaAs-GaP, and BAs, means for introducing negative charge carriers into said body including a layer of insulator material upon a surface of said body said insulator material having a high work function, a bandgap substantially larger than that of said body material, a thickness which permits tunneling of charge carriers through said insulating material in the range of 10 to 1000 Angstrom units, and selected from the group consisting of MgO, $CdF_2$, $CaF_2$, $ZnF_2$, $Al_2O_3$, BeO, $Ta_2O_3$, and $ZnSiO_4$, and a layer of N-type semiconductor material upon said insulator layer, said N-type material having a bandgap which is larger than that of said body material and smaller than that of said insulator material, and selected from the group consisting of $SnO_{(2-x)}$, $In_2O_{(3-x)}$, and $CdF_2$:Sm:Cd;

and means for introducing positive charge carriers into said body.

9. A device for producing recombination radiation comprising a body of P-type luminescent material, means for introducing negative charge carriers into said body including a layer of insulator material upon a surface of said body, said insulator material having a high work function, a bandgap substantially larger than that of said body material, and a thickness which permits tunneling of charge carriers therethrough, in the range between 10 and 1000 A.U.

a layer of N-type semiconductor material upon said insulator layer, said In-type having a bandgap which is larger than that of said body material and smaller than that of said insulator material, and a metal electrode in contact with said semiconductor layer;

and means for introducing positive charge carriers into said body, said means for introducing positive charge carriers being transparent to said recombination radiation.

10. A device for producing recombination radiation comprising a body of substantially intrinsic luminescent material, means for introducing positive charge carriers into said body including a first layer of insulator material upon a surface of said body, said first insulator material having a bandgap substantially larger than that of said luminescent material and a thickness which permits tunneling of charge carriers through said insulator material, and a layer of P-type semiconductor material upon said first insulator layer and having a bandgap which is larger than that of said body semiconductor and smaller than that of said first insulator, and means for introducing negative charge carriers into said body including a second layer of insulator material upon a surface of said body, said second insulator material having a bandgap substantially larger than that of said luminescent material and a thickness which permits tunneling of charge carriers through said insulator material, and a layer of N-type semiconductor material upon said second insulator layer and having a bandgap which is larger than that of said luminescent material and smaller than that of said insulator material.

11. A device for producing recombination radiation comprising a body of substantially intrinsic luminescent material, means for introducing positive charge carriers into said body including a first layer of insulator material upon a surface of said body, said first insulator material having a lower work function and a substantially larger bandgap than that of said luminescent material and a thickness which permits tunneling of charge carriers through said insulator material in the range between 10 and 1000 A.U., a layer of P-type semiconductor material upon said first insulator layer and having a bandgap which is larger than that of said P-type semiconductor and smaller than that of said first insulator, and an ohmic electrode in contact with said semiconductor layer, and means for introducing negative charge carriers into said body including a second layer of insulator material upon a surface of said body, said second insulator material having a higher work function and a substantially larger bandgap than that of said luminescent material and a thickness which permits tunneling of charge carriers therethrough in the range between 10 and 1000 A.U., a layer of N-type semiconductor material upon said second insulator layer and having a bandgap which is larger than that of said body material and smaller than that of said insulator material and a metal electrode in contact with said N-type semiconductor layer;

at least one of said carrier introducing means being transparent to recombination radiation.

References Cited by the Examiner

UNITED STATES PATENTS

| | | | |
|---|---|---|---|
| 2,938,136 | 5/1960 | Fischer | 313—108 |
| 3,024,140 | 3/1962 | Schmidlin | 307—88.5 |

OTHER REFERENCES

Fischer: Injection Electroluminescence, Solid-State Electronics, vol. 2, Pergamon Press, 1961, No. TK7800 S58, pages 232–246.

Jaklevic et al.: Injection Electroluminescence in CdS by Tunneling Films, Applied Physics Letters, vol. 2, No. 1, January 1963, pages 7–9, No. QCI A745.

DAVID J. GALVIN, *Primary Examiner.*

GEORGE N. WESTBY, *Examiner.*

R. JUDD, *Assistant Examiner.*

UNITED STATES PATENT OFFICE

CERTIFICATE OF CORRECTION

Patent No. 3,267,317 August 16, 1966

Albrecht G. Fischer

It is hereby certified that error appears in the above numbered patent requiring correction and that the said Letters Patent should read as corrected below.

Column 5, line 72, after "Ga(P,As)" insert -- GaN --; column 10, line 56, for "In-type" read -- N-type material --.

Signed and sealed this 1st day of August 1967.

(SEAL)
Attest:

Edward M. Fletcher, Jr.
Attesting Officer

EDWARD J. BRENNER
Commissioner of Patents